No. 711,991. Patented Oct. 28, 1902.
V. W. MASON, Jr.
GEAR WHEEL.
(Application filed Jan. 2, 1902.)
(No Model.)

Witnesses:
H. B. Davis.
M. E. Bill.

Inventor:
Volney W. Mason Jr.
by B. Johnson
Atty

UNITED STATES PATENT OFFICE.

VOLNEY W. MASON, JR., OF NEW YORK, N. Y.

GEAR-WHEEL.

SPECIFICATION forming part of Letters Patent No. 711,991, dated October 28, 1902.

Application filed January 2, 1902. Serial No. 88,205. (No model.)

*To all whom it may concern:*

Be it known that I, VOLNEY W. MASON, Jr., of New York, county of New York, and State of New York, have invented an Improvement in Gear-Wheels, of which the following description, in connection with the accompanying drawings, is a specification, like letters on the drawings representing like parts.

This invention relates to gear-wheels of that type having a removable toothed part which is connected with a central portion, and has for its object to improve the construction of such gear-wheels to the end that they shall be very durable and capable of withstanding a severe strain which may be put upon them and also to the end that the removable toothed part may be made of manganese steel.

Figure 1:
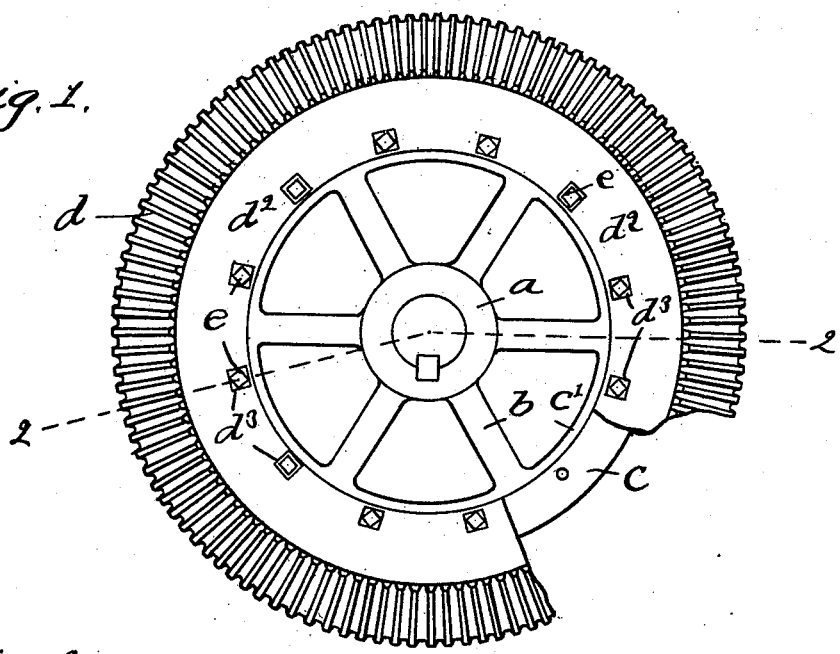
Figure 2:
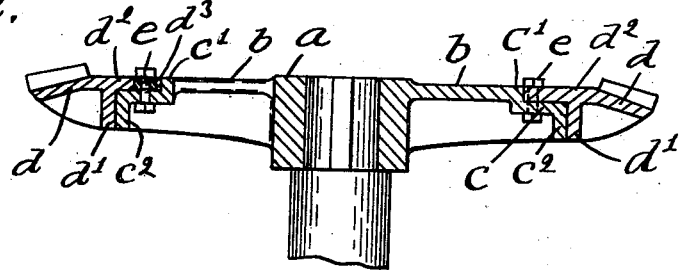
Figures 3, 4:
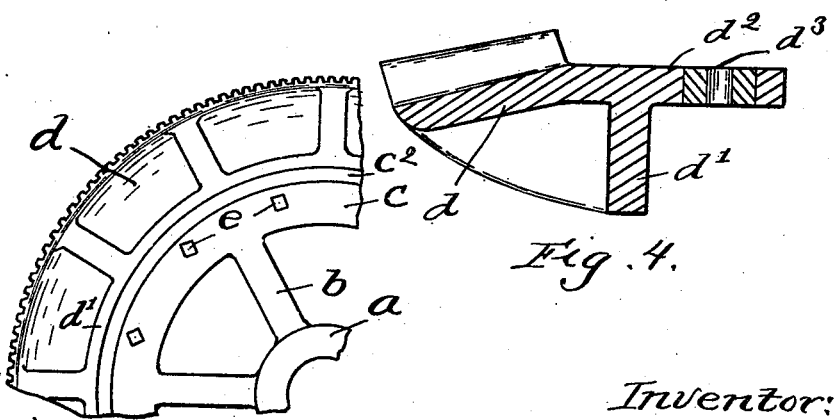

Figure 1 shows in plan view a gear-wheel embodying this invention, a portion of the toothed part being removed. Fig. 2 is a vertical section of the gear-wheel shown in Fig. 1, taken on the dotted line 2 2. Fig. 3 is an under side view of a portion of the gear-wheel shown in Fig. 1, and Fig. 4 is a sectional detail of the removable toothed part.

$a$ represents a hub, $b$ the spokes, and $c$ the rim, of the gear-wheel. The rim $c$ is formed with a shoulder $c'$ and with a downwardly-projecting flange $c^2$.

$d$ represents the removable toothed part and, as herein shown, is formed with an obliquely-disposed flange bearing the teeth and with a downwardly-projecting flange $d'$, adapted to abut against the flange $c^2$ on the rim, and with a flange $d^2$, projecting at approximately right angles to the flange $d'$, which overlies the rim $c$ for a short distance and abuts against the shoulder $c'$.

By forming the rim and toothed part as herein shown a very substantial connection is made between the toothed part and rim, whereby the gear is capable of withstanding a very severe strain without injury.

It is designed and intended to make the re-
movable toothed part of manganese steel, as such metal possesses extraordinary durability and toughness, and consequently a number of plugs $d^3$, of machineable metal, are cast into the flange $d^2$ of said toothed part, which are afterward drilled to receive bolts $e$, which pass through the rim and serve as a means of securing the toothed part to the rim.

I do not desire to limit my invention to attaching the removable toothed part to the rim by bolts in this manner.

By the construction herein described the toothed part is easily removable and interchangeable.

What I claim as my invention, and desire to secure by Letters Patent, is—

1. The bevel gear-wheel herein shown and described consisting of a hub, spokes and rim, the latter having the shoulder $c'$ and a downwardly-projecting flange, and a removable toothed part having an oblique flange bearing teeth, a downwardly-projecting flange which abuts against the flange of the rim, and another flange at approximately right angles to said downwardly-projecting flange which overlies the rim, and means for securing said toothed part to the rim, substantially as described.

2. The gear-wheel herein shown and described, consisting of a hub, spokes and rim, and a removable toothed part having a flange which overlies said rim, machineable-metal plugs incorporated in said flange through which holes are drilled, and bolts connecting the removable toothed part to the rim which pass through said holes, substantially as described.

In testimony whereof I have signed my name to this specification in the presence of two subscribing witnesses.

VOLNEY W. MASON, JR.

Witnesses:
B. J. NOYES,
H. B. DAVIS.